(12) United States Patent
Tashiro et al.

(10) Patent No.: US 6,810,314 B2
(45) Date of Patent: Oct. 26, 2004

(54) INTEGRATED CONTROL SYSTEM FOR VEHICLE

(75) Inventors: Tsutomu Tashiro, Nagoya (JP); Noboru Miyamoto, Fukuoka (JP); Takehito Fujii, Anjo (JP)

(73) Assignee: Denso Corporation, Kariya (JP)

( * ) Notice: Subject to any disclaimer, the term of this patent is extended or adjusted under 35 U.S.C. 154(b) by 16 days.

(21) Appl. No.: 10/155,009

(22) Filed: May 28, 2002

(65) Prior Publication Data

US 2002/0183911 A1 Dec. 5, 2002

(30) Foreign Application Priority Data

May 29, 2001 (JP) ........................................ 2001-161091

(51) Int. Cl.[7] ................................................ G06F 7/00
(52) U.S. Cl. ............................ 701/48; 701/31; 701/33; 700/3; 700/20; 710/264
(58) Field of Search .............................. 701/31, 34, 1, 701/48, 33, 51, 53, 71, 102, 36, 104, 110, 29, 32; 700/9, 19, 21, 27, 2, 3, 20; 340/3.1–3.2; 714/33–35, 10–13; 710/119–121, 241–244, 264, 110; 477/34, 107, 78; 303/112; 702/183

(56) References Cited

U.S. PATENT DOCUMENTS

| | | | | |
|---|---|---|---|---|
| 4,774,625 A | * | 9/1988 | Yamanaka | 712/31 |
| 5,003,476 A | * | 3/1991 | Abe | 701/33 |
| 5,091,856 A | * | 2/1992 | Hasegawa et al. | 701/36 |
| 5,369,584 A | * | 11/1994 | Kajiwara | 701/48 |
| 5,481,456 A | * | 1/1996 | Ogura | 701/1 |
| 5,832,397 A | * | 11/1998 | Yoshida et al. | 701/29 |
| 5,957,985 A | * | 9/1999 | Wong et al. | 701/33 |
| 6,006,143 A | * | 12/1999 | Bartel et al. | 701/1 |
| 6,154,688 A | | 11/2000 | Dominke et al. | 701/1 |
| 6,421,593 B1 | * | 7/2002 | Kempen et al. | 701/48 |
| 6,463,373 B2 | * | 10/2002 | Suganuma et al. | 701/48 |
| 6,466,851 B2 | * | 10/2002 | Kato et al. | 701/51 |
| 6,470,252 B2 | * | 10/2002 | Tashiro et al. | 701/51 |
| 6,553,297 B2 | * | 4/2003 | Tashiro et al. | 701/48 |
| 6,629,033 B2 | * | 9/2003 | Preston et al. | 701/70 |
| 6,654,648 B2 | * | 11/2003 | Nada et al. | 700/19 |
| 2003/0144784 A1 | * | 7/2003 | Tashiro et al. | 701/54 |

FOREIGN PATENT DOCUMENTS

| | | |
|---|---|---|
| JP | 3-176239 | 7/1991 |
| JP | 6-351078 | 12/1994 |

* cited by examiner

Primary Examiner—Jacques H. Louis-Jacques
(74) Attorney, Agent, or Firm—Nixon & Vanderhye P.C.

(57) ABSTRACT

An integrated control system for a vehicle comprises a plurality of system device control units for controlling system devices in a vehicle, and a manager control unit for providing the system device control units with commands serving as operation directives of the system devices. A particular one of the system device control units has a hierarchical layer. If the predetermined operation should be carried out, the particular system device control unit issues a command to the particular system device as an independent operation directive for driving the particular system device to carry out the predetermined operation independently of an operation directive issued by the manager control unit.

15 Claims, 7 Drawing Sheets

INTEGRATED CONTROL SYSTEM FOR VEHICLE

CROSS REFERENCE TO RELATED APPLICATION

This application is based on and incorporates herein by reference Japanese Patent Application No. 2001-161091 filed on May 29, 2001.

FIELD OF THE INVENTION

The present invention relates to a system for controlling a plurality of system devices mounted on a vehicle in an integrated manner. The system devices include an engine, a transmission and a brake device. More particularly, the present invention relates to an integrated vehicle control system appropriate for implementation of a quick response control according to the condition of the vehicle.

BACKGROUND OF THE INVENTION

In order to keep up with the system's complication accompanying an increasing number of system devices composing the vehicle, an integrated vehicle control system with a configuration, which allows control data to be exchanged among control devices provided individually to a plurality of system devices so that stable control can be executed for the vehicle as a whole.

In an integrated vehicle control system disclosed in U.S. Pat. No. 6,154,688 (JP-A-10-250417), for example, control devices for coping with control problems such as the engine's driving and braking powers and control devices for controlling operating characteristics of the vehicle are positioned to form a hierarchical (layered) structure. In addition, a whole vehicle control unit for controlling these control devices in an integrated way is provided. Then, by providing required characteristics in the order from the highest level hierarchical layer to low level hierarchical layers, operations of system devices controlled by the control devices are determined and control optimum for the vehicle as a whole can be implemented.

By separating the control system of a vehicle into a plurality of subsystems as described above, it is possible to reduce the number of control system devices whose design needs to be changed, for example, when the specifications of the system are modified. Thus, the time it takes to change the design can be shortened. As an alternative, by maintaining mutual independence of the system devices, the individual system devices can be developed concurrently. As a result, required development time of a vehicle can be shortened as a whole.

With the conventional technology, however, a system device is no longer capable of operating with a quick response in dependence on the circumstances of system devices composing a vehicle in such a case that a system device mechanically reflecting an operation carried out by the driver in a direct manner is operated or a case that a failure or an abnormality occurs in the system device. A quick response operation for such cases cannot be taken due to the fact that control processing is carried out on the basis of a command from a control device placed on the highest level hierarchical layer.

When a driver changes a shift lever from the drive D range to the neutral N range in a running state of the vehicle, for example, it is not until transmission of an operation command of the shift lever to the highest level hierarchical layer that power transmission between the engine and the drive axle is turned off in accordance with the command coming from the highest level hierarchical layer. Thus, an operation cannot be taken quick in response to the operation carried out by the driver. In addition, in a vehicle equipped with a CVT (continuously variable transmission) an abnormality of an oil pressure mechanism for changing the transmission gear ratio may result in a circumstance in which the belt inadvertently slips. This is because, in this case, the highest level hierarchical layer issues a command to a lower level hierarchical layer in accordance with the abnormal condition so that a quick response operation can no longer be taken.

SUMMARY OF THE INVENTION

It is thus an object of the present invention to provide an integrated vehicle control system capable of responding to circumstances of system devices composing the vehicle.

An integrated control system for a vehicle according to the present invention comprises a plurality of system device control units for controlling a plurality of system devices in a vehicle; and a manager control unit for providing the system device control units with commands serving as operation directives of the system devices. At least a particular one of the system device control units attains a hierarchical layer secession determination process for determining whether a particular system device controlled by the particular system device control unit has entered a state requiring that a predetermined operation taking precedence of execution of an operation directive issued by the manager control unit to be carried out. If it is determined in the hierarchical layer secession process that the predetermined operation should be carried out, the particular system device control unit issues a command to the particular system device as an independent operation directive for driving the particular system device to carry out the predetermined operation independently of an operation directive issued by the manager control unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
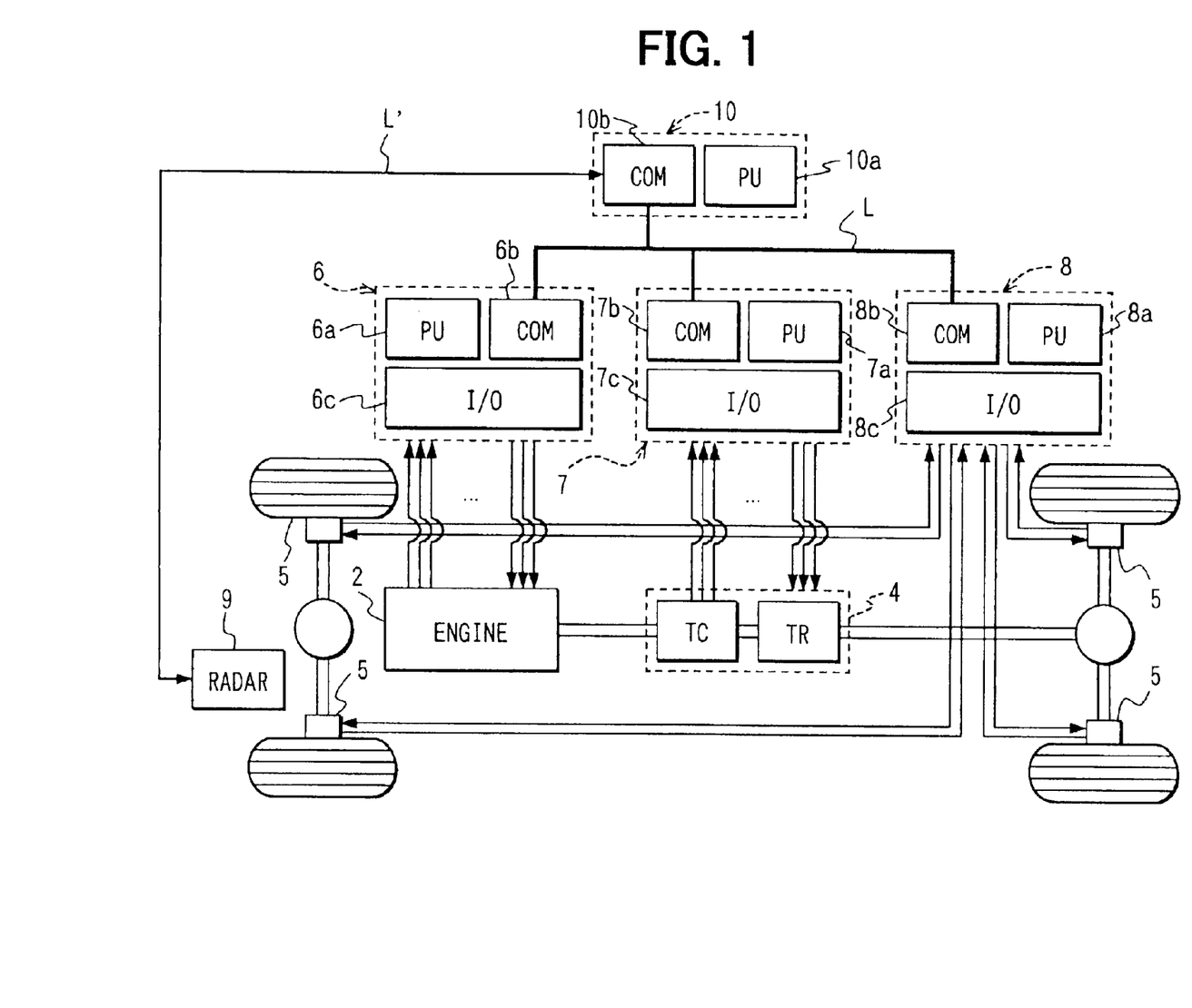
FIG. 1 is a block diagram showing an integrated vehicle control system according to an embodiment of the present invention.

An integrated vehicle control system implemented by the embodiment is illustrated in FIG. 1. This integrated vehicle control system implemented by the embodiment executes integrated control of a vehicle driving system's devices, that is, the engine 2 serving as a driving power generating unit and a continuously variable transmission (CVT) as well as a vehicle braking system's device, that is, a brake device 5. The integrated vehicle control system comprises the system device control units, that is, an engine ECU 6, a CVT ECU 7 and a brake ECU 8, which are used for controlling the engine 2, the CVT 4 and the brake device 5, respectively. The integrated vehicle control system also includes a manager control ECU 10 serving as a manager control unit for giving commands directing operations of the engine 2, the CVT 4 and the brake device 5 to the engine ECU 6, the CVT ECU 7 and the brake ECU 8, respectively.

The ECUs 6, 7, 8 and 10 are electronic control units including respectively processing units 6a, 7a, 8a and 10a, which are microcomputers independent of each other. The ECUs 6, 7, 8 and 10 have respective communication units 6b, 7b, 8b and 10b, which are connected to each other by a communication line L for transmission of data. The communication units 6b, 7b, 8b and 10b are each capable of transmitting and receiving data for the vehicle control units.

The engine ECU 6, the CVT ECU 7 and the brake ECU 8 comprise respectively signal input/output units 6c, 7c and 8c for inputting detection signals generated by a variety of sensors for detecting the states of the engine 2, the CVT 4 and the brake device 5 respectively and for outputting driving signals to a variety of actuators provided on the engine 2, the CVT 4 and the brake device 5 respectively.

The input/output unit 6c employed in the engine ECU 6 is connected to sensors and switches including an acceleration pedal sensor for detecting a pedal depression quantity of an acceleration pedal being depressed by the driver, an airflow meter for detecting an intake airflow (or an intake quantity), an intake temperature sensor for detecting an intake air temperature, a throttle opening sensor for detecting an opening of a throttle valve, an oxygen concentration sensor for detecting a concentration of oxygen contained in exhausted gas, a knocking sensor for detecting knocking, a water temperature sensor for detecting a temperature of cooling water, a crank angle sensor for detecting a crankshaft rotational angle and rotational speed, and an ignition switch. The input/output unit 6c employed in the engine ECU 6 is also connected to a variety of actuators for controlling the engine 2.

Although not shown in the figure, the actuators include an injector provided on each cylinder of the engine 2, an igniter for generating an ignition high voltage, a fuel pump for pumping up fuel from a fuel tank and supplying the fuel to the injectors and a throttle driving motor for opening and closing the throttle valve, which is provided on an intake pipe of the engine 2.

The input/output unit 7c employed in the CVT ECU 7 is connected to sensors and switches including a rotation sensor for detecting the number of revolutions of an input shaft extended from a torque converter of the CVT 4 to a transmission, a vehicle speed sensor for detecting a speed of the vehicle from the number of revolutions of an axle shaft connected to the output shaft of the CVT 4, a shift position switch for detecting a shift position representing the operation position of a shift lever operated by the driver and a temperature sensor for detecting the temperature of operation oil in the CVT 4. The input/output unit 7c employed in the CVT ECU 6 is also connected to a variety of actuators for controlling the CVT 4.

Although not shown in the figure, the actuators include a secondary pressure solenoid for adjusting a source pressure of an oil pressure control mechanism and adjusting the oil pressure of an output side pulley serving as a secondary pulley, a primary pressure solenoid for adjusting the oil pressure of an input side pulley serving as a primary pulley and a lockup pressure solenoid for operating a tightening force of a lockup clutch for tightening an input/output shaft of a torque converter.

The input/output unit 8c employed in the brake ECU 8 is connected to sensors and switches including a brake pedal sensor for detecting a pedal depression quantity of the brake pedal, wheel speed sensors each used for detecting a revolution speed of a wheel, a master cylinder pressure sensor for detecting a pressure in a master cylinder of the brake device 5, a steering sensor for detecting a steering angle of the vehicle, a yaw rate sensor for detecting a yaw rate of the vehicle and a stop lamp switch for detecting the state of stop lamps turned on by a brake operation carried out by the driver, that is, for detecting the brake operation carried out by the driver. The input/output unit 8c employed in the brake ECU 8 is also connected to a brake actuator for executing brake control by generating an oil pressure in the master cylinder. The brake actuator itself is not shown in the figure.

In addition, on the. front portion of the vehicle, a radar sensor (radar unit) 9 using a supersonic wave, an electric wave, a laser, an infrared ray or another signal carrier is provided. The radar sensor 9 is used for measuring a relative distance to an object existing in front of the vehicle and determining the moving direction of the front thing. Information generated by the radar sensor 9 is supplied to a communication unit of the manager control ECU 10 through a communication line L'.

The communication line L is used for exchanging various kinds of information necessary for control among the engine ECU 6, the CVT ECU 7, the brake ECU 8 and the manager control ECU 10.

The processing units 6a, 7a, 8a and 10a employed in the ECUs 6, 7, 8 and 10 respectively carry out control processing to control the engine 2, the CVT 4, the brake engine 5 and the system as a whole respectively in accordance with control programs stored in their respective memories. To be more specific, the processing units 6a, 7a, 8a and 10a carry out engine control processing, CVT control processing, brake control processing and integrated control processing, respectively.

Next, the engine control processing, the CVT control processing, the brake control processing and the integrated control processing, which are carried out by the ECUs 6, 7, 8 and 10, respectively, are explained as follows.

Figure 2:
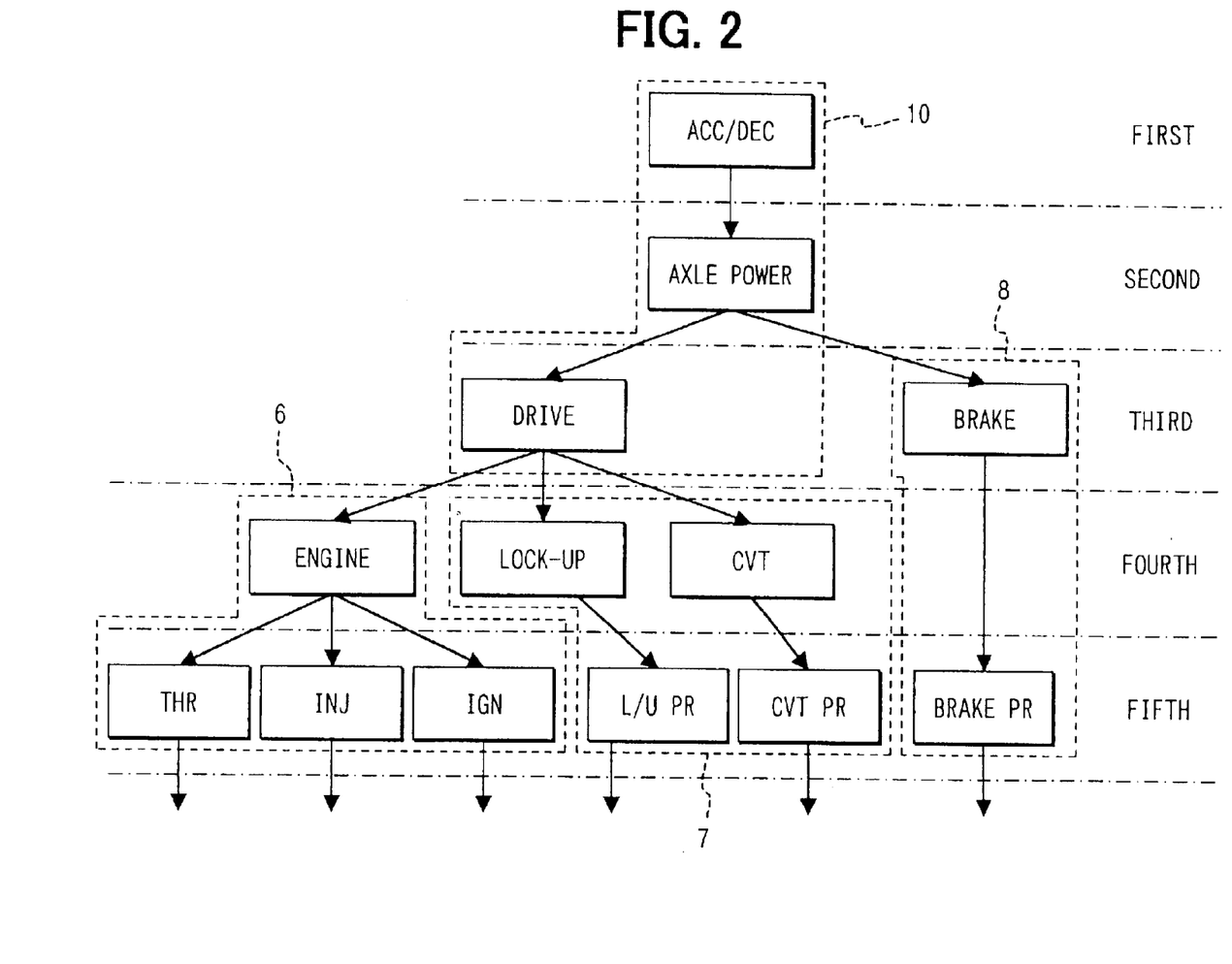
FIG. 2 is a block diagram showing control processing carried out by each ECU in the embodiment.

First of all, the entire configuration of the control processing carried out by the ECUs is explained by referring to FIG. 2.

As shown in FIG. 2, the control processing carried out by the ECUs is configured into a hierarchical structure. In the hierarchical structure, control modules for carrying out the control processing are laid out to form a treelike shape. As a control command propagates from an upper level hierarchical layer to a lower level hierarchical layer, the control command is transformed into a control command of the lower level concept. In addition, since the control modules are each connected to the communication line L, the control modules are capable of exchanging information among them. Required for the control processing, the exchanged information includes sensor information generated by the sensors, which are not shown in the figure, and a control command issued by a higher level control module.

The following actual control modules are placed on the hierarchical layers. On the first hierarchical layer at the highest level, there is placed a vehicle acceleration and deceleration control module for computing a target acceleration and a target deceleration, which are required in control of the running state of the vehicle, in accordance with the surrounding environment. In addition, on the second hierarchical layer connected to the hierarchical first layer, there is placed an axle rotation power control module for computing a driving torque and a braking torque, which are required in implementation of a target acceleration requested as a command from the first hierarchical layer.

Furthermore, on the third hierarchical layer connected to the second hierarchical layer, a driving control module for controlling a driving force of the engine and controlling a driving connection state between the transmission and the engine is provided. Further, on this third hierarchical layer, a brake control module for controlling a braking force and controlling the contact states between tires and the surface of a road is provided.

Moreover, on the fourth hierarchical layer, an engine control module, a lockup control module and a CVT control module, which are connected to the driving control module on the third hierarchical layer, are provided. It should be noted that no control module connected to the brake control module exists on the fourth hierarchical layer.

Finally, on a fifth hierarchical layer at the bottom level, there are disposed an electronic throttle control module, an injector control module and an ignition control module, which are connected to the engine control module. Further, on this fifth hierarchical layer, a lockup oil pressure control module and a CVT oil pressure control module, which are connected to the lockup control module and the CVT control module respectively are disposed. In addition, this fifth hierarchical layer includes a brake oil pressure control module connected to the brake control module on the third hierarchical layer. Directly connected to their respective actuators, the control modules provided on this fifth hierarchical layer carry out various kinds of control processing.

The vehicle acceleration and deceleration control module provided on the first hierarchical layer, the axle rotation power control module provided on the second hierarchical layer and the driving control module provided on the third hierarchical layer are incorporated in the manager control ECU 10 shown in FIG. 1. The engine control module provided on the fourth hierarchical layer and the control modules subordinate to the engine control module are incorporated in the engine ECU 6. The lockup control module provided on the fourth hierarchical layer and the control module subordinate to the lockup control module are incorporated in the CVT ECU 7. The CVT control module provided on the fourth hierarchical layer and the control module subordinate to the CVT control module are also incorporated in the CVT ECU 7. The brake control module provided on the third hierarchical layer and the control module subordinate to the brake control module are incorporated in the brake ECU 8.

It should be noted that the manager control ECU 10 serves as a manager control unit. The engine ECU 6, the CVT ECU 7 and the brake ECU 8 are each used as a system device control unit. To be more specific, the engine ECU 6, the CVT ECU 7 and the brake ECU 8 serve as respectively a driving force generator control unit, a transmission control unit and a brake control unit. The vehicle acceleration and deceleration control module provided on the first hierarchical layer serves as a whole vehicle operation determination unit. The driving control module provided on the third hierarchical layer serves as a system device integrated control unit. The engine control module, the lockup control module and the CVT control module, which are provided on the fourth hierarchical layer, as well as the brake control module. provided on the third hierarchical layer each serve as a system device integrated control unit. The electronic throttle control module, the injector control module, the ignition control module, the lockup oil pressure control module, the CVT oil pressure control module and the brake oil pressure control module each serve as a system device control unit.

The vehicle acceleration and deceleration control module provided on the first hierarchical layer sets a vehicle acceleration and deceleration and supplies it to the second hierarchical layer as a command specifying an operation directive. The vehicle acceleration and deceleration is requested by the engine ECU 6 through the communication line L in accordance with information on operations and information on a running environment. Provided by the driver, the information on operations includes information relevant to the acceleration pedal and the brake pedal. The information on the running environment is information on the operation of the vehicle. Examples of the information on the operation of the vehicle are the speed of the vehicle and the magnitude of the load borne by the engine. Alternatively, a vehicle acceleration and deceleration to be supplied to the second hierarchical layer as a command specifying an operation directive can also be set on the basis of information showing a positional relation with a vehicle in front of this vehicle. Such information is input from the laser sensor 9.

The axle rotation power control module provided on the second hierarchical layer computes axle shaft torque for implementing the axle shaft acceleration and deceleration requested by the vehicle acceleration and deceleration control module. To be more specific, the axle rotation power control module computes a driving torque and a braking torque as a target driving torque and a target braking torque for implementing the axle shaft torque, respectively.

Figure 3:
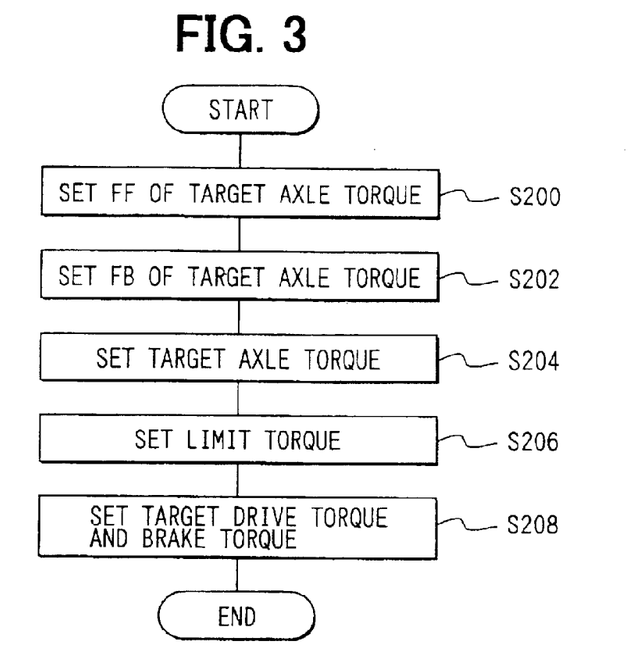
FIG. 3 is a flowchart representing control processing carried out at a second hierarchical layer by the ECU.

The processing shown in FIG. 3 begins with step S200 at which a target axle shaft FF (feed forward) term is set in accordance with a map between the target acceleration and deceleration received from the vehicle acceleration and deceleration control module and the speed of the vehicle. The target axle shaft FF (feed forward) term is set as a torque corresponding to a target acceleration and deceleration on a level road and by consideration of running resistances such as the vehicle's air resistance and rolling resistance.

Then, at the next step S202, a target axle shaft FB (feedback) term is set on the basis a deviation between the target acceleration and deceleration and an actual acceleration and deceleration. The actual acceleration and deceleration is a value provided as a result of applying a low pass filter to a difference between the vehicle speed's present value and previous value. It should be noted the target axle shaft FB (feedback) term is set by taking dynamic characteristics of the vehicle into consideration at such a value that the target acceleration and deceleration can be followed in a stable and quick response. Subsequently, at the next step S204, the sum of the target axle shaft FF term and the target axle shaft FB term is set as a target axle shaft torque.

Then, at the next step S206, a driving brake limit (boundary) torque is computed. Set in dependence on the speed of the vehicle, the driving brake limit torque is an inertial torque, which is applied to the axle shaft in a condition of the level ground and no wind when the vehicle put in an inertia running state. With the engine 2 set in the inertia running state, the throttle opening is completely closed, no ignition is allowed to occur and the brake is not applied.

Subsequently, at the next step S208, a target driving torque and a target braking torque are set. If the difference between the target axle shaft torque and the driving braking limit torque is positive, a request for acceleration is determined to have been made. A value computed on the basis of the difference between the target axle shaft torque and the driving braking limit torque is set as a target driving torque while the target braking torque is set at 0.

If the target axle shaft torque is equal to the driving braking limit torque, the target driving torque and the target braking torque are both set at 0.

If the difference between the target axle shaft torque and the driving braking limit torque is negative, a request for deceleration is determined to have been made. A value computed on the basis of the difference between the target axle shaft torque and the driving braking limit torque is set as a target braking torque while the target driving torque is set at 0.

The driving control module provided on the third hierarchical layer computes an engine torque for producing a target driving torque set by the axle rotation power control module, a transmission gear ratio and a lockup state as an operation directive's target engine torque, target transmission gear ratio and target lockup state, respectively. A lockup state is on or off status of a lockup mechanism.

Specifically, a target transmission gear ratio and a target lockup state are set on the basis of the vehicle speed detected by the vehicle speed sensor not shown in the figure and the target driving torque by referring to a lockup map and a transmission map set in advance. Then, a value provided as a result of dividing the target driving torque by the target transmission gear ratio is further divided by a torque converter's torque amplification ratio for the target lockup state to give a target engine torque.

Subsequently, the target engine torque set in this way is supplied to the engine control module, the lockup control module and the CVT control module, which are provided on the fourth hierarchical layer, through the communication line L. On the other hand, the target lockup state and the target transmission gear ratio are supplied to the lockup control module and the CVT control module respectively through the communication line L.

Then, the engine control module provided on the fourth hierarchical layer computes a target throttle opening, a target fuel injection quantity and a target ignition timing on the basis of the received target engine torque, and supplies the target throttle opening, the target fuel injection quantity and the target ignition timing respectively to the electronic throttle control module, the injector control module and the ignition control module, which are provided on the fifth hierarchical layer.

Similarly, the lockup control module provided on the fourth hierarchical layer computes a target lockup oil pressure on the basis of the received target engine torque and the received target lockup state, and supplies the target lockup oil pressure to the lockup oil pressure control module provided on the fifth hierarchical layer. On the other hand, the CVT control module provided on the fourth hierarchical layer computes a target secondary oil pressure and a target primary oil pressure on the basis of the received target engine torque and the received target lockup state, and supplies the target secondary oil pressure and the target primary oil pressure to the brake oil pressure control module provided on the fifth hierarchical layer. In addition, the brake control module provided on the third hierarchical layer computes a target brake oil pressure on the basis of the received target brake torque, and supplies the target brake oil pressure to the brake oil pressure control module provided on the fifth hierarchical layer. Then, the control modules provided on the fifth hierarchical layer drive their respective actuators connected to the fifth hierarchical layer on the basis of the operation directives.

In the integrated vehicle control system described above, for normal processing, control processes are executed on the basis of a control command issued by the vehicle acceleration and deceleration control module provided on the hierarchical layer at the highest level.

In a situation where system devices should carry out predetermined operations taking precedence of implementation of an operation directive given by the manager control ECU 10, a quick response operation cannot be taken if the system devices must wait for a command to come from the first hierarchical layer. If a failure occurs in a system device, for example, a quick response operation cannot be taken if the system devices must wait for a command coping with the failure to be issued from the first hierarchical layer.

Thus, in such a case, the ECU 6, 7 or 8 directly issues its own operation directive for carrying out a predetermined operation for handling a failure to a failing system device independently of a control command issued by the manager control ECU 10.

Hierarchical layer secession determination processing is carried out to determine whether there has been generated a situation where system devices should carry out predetermined operations taking precedence of implementation of an operation directive given by the manager control ECU 10. Details of the hierarchical layer secession determination processing are explained by referring to flowcharts shown in FIGS. 4 to 8.

It should be noted that, in this embodiment, this hierarchical layer secession determination processing is carried out at predetermined intervals by at least one of the engine control module, the lockup control module and the CVT control module, which are provided on the fourth hierarchical layer, and the brake control module provided on the third hierarchical layer.

Figure 4:
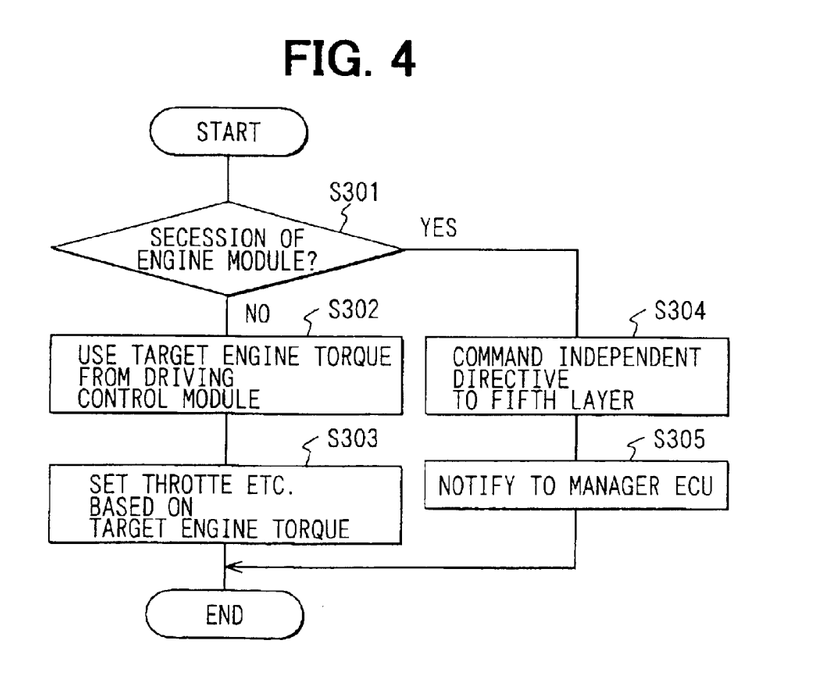
FIG. 4 is a flowchart representing hierarchical layer secession determination processing carried out by an engine control module in the embodiment.

First of all, the hierarchical layer secession determination processing carried out by the engine control module is explained by referring to a flowchart shown in FIG. 4.

As shown in FIG. 4, the processing begins with step S301 to determine whether the engine control module should secede from a hierarchical layer. The engine control module is determined to secede from a hierarchical layer when the operating state of the engine can no longer be controlled with a high degree of freedom. The operating state of the engine can no longer be controlled with a high degree of freedom, for example, when a failure occurs in the electronic throttle, the injector or the igniter. Specifically, when a signal transmitted to the engine ECU 6 after being detected by a sensor provided on a part of the engine has an abnormal level, the engine control module is determined to secede from a hierarchical layer.

If a determination result provided at step S301 is YES indicating that the engine control module should secede from a hierarchical layer, the processing moves to step S304 at which independent operation directives are set so that the throttle opening is completely closed, injection of fuel is cut off and ignition is prohibited to prevent the engine from generating a torque, and the operation directives are supplied to the control modules provided on the fifth hierarchical layer to drive their respective actuators. Then, the manager control ECU 10 is informed of the fact that an operation directive issued by the manager control ECU 10 cannot be executed.

It should be noted that, instead of giving a command to the engine 2 so as to generate no driving torque, an independent operation directive can also be issued to the engine 2 so as to reduce the driving torque generated by the engine 2.

If the determination result provided at step S301 is NO indicating that the engine control module should not secede from a hierarchical layer, on the other hand, the processing moves to step S302 at which a command given by the driving control module is used as a target engine torque. Then, at the next step S303, a target ignition timing, a target throttle opening and a target fuel injection quantity, which are proper for the target engine torque, are computed.

Specifically, in the computation of the target ignition timing, first of all, a target cylinder fuel amount and a target air-fuel ratio are computed on the basis of the target engine torque and the number of engine revolutions. The target cylinder fuel amount is the amount of fuel required in a cylinder. Then, a target cylinder air amount is computed from the target cylinder fuel amount and the target air-fuel ratio. Finally, the target ignition timing is calculated on the basis of the number of engine revolutions and the target cylinder air amount.

The computation of the target throttle opening for the target cylinder air amount is based on a map representing a relation between the target cylinder air amount value completing phase lead processing and the number of engine revolutions. The target cylinder air amount value completing phase lead processing is deliberately used so as to compensate the target cylinder air amount for an air lag caused by a time it takes for the air to flow along the intake pipe.

In the computation of the target fuel injection quantity, a value provided by adjustment based on variations in estimated amount of fuel stuck and remaining inside the intake pipe is taken as the target fuel injection quantity for the target cylinder air amount. The variations in estimated amount of fuel stuck inside the intake pipe are computed on the basis of the target intake air amount and the engine water temperature.

Signals representing the target ignition timing, the target throttle opening and the target fuel injection quantity, which are computed as described above, are supplied to the ignition control module, the electronic throttle control module and the injector control module respectively so that these control modules drive their respective actuators. As described above, the ignition control module, the electronic throttle control module and the injector control module are control modules provided on the fifth hierarchical layer.

Figure 5:
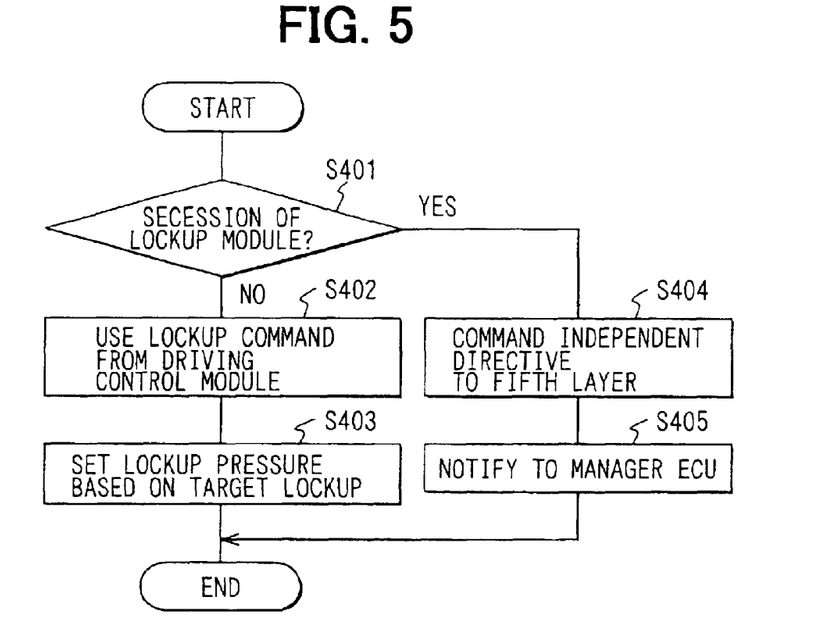
FIG. 5 is a flowchart representing hierarchical layer secession determination processing carried out by a lockup control module in the embodiment.

Next, the hierarchical layer secession determination processing carried out by the lockup control module is explained by referring to the flowchart shown in FIG. 5.

Specifically, the processing begins with step S401 to determine whether the lockup control module should secede from the hierarchical layer. The lockup control module is determined to secede from the hierarchical layer when the lockup state can no longer be controlled with a high degree of freedom. The lockup state can no longer be controlled with a high degree of freedom, for example, when the temperature of operation oil becomes extremely high or extremely low, and/or jadders are generated in the clutch.

If the determination result provided at step S401 is YES indicating that the throttle control module should secede from the hierarchical layer, the processing moves to step S404 at which the target lockup oil pressure is given to the fifth hierarchical layer as an independent operation directive. The target lockup pressure is the lowest oil pressure to release the lockup clutch. Then, at the next step S405, the manager control ECU 10 is notified of the state of non-execution of its directive, that is, secession from the layer.

If the determination result provided at step S401 is NO indicating that the throttle control module should not secede from the hierarchical layer, on the other hand, the processing moves to step S402 at which an operation is taken to tighten or release the lockup clutch state in accordance with a lockup control command received from the driving control module provided on the third hierarchical layer. Then, at the next step S403, the target lockup oil pressure proper for the target lockup state is computed. Specifically, if a command to tighten the lockup clutch state is issued, the target lockup oil pressure is raised. If a command to release the lockup clutch state is issued, on the other hand, the target lockup oil pressure is lowered. Then, the lockup oil pressure control module provided on the fifth hierarchical layer sets a signal to drive a solenoid for controlling the lockup oil pressure to the received target lockup oil pressure.

Figure 6:
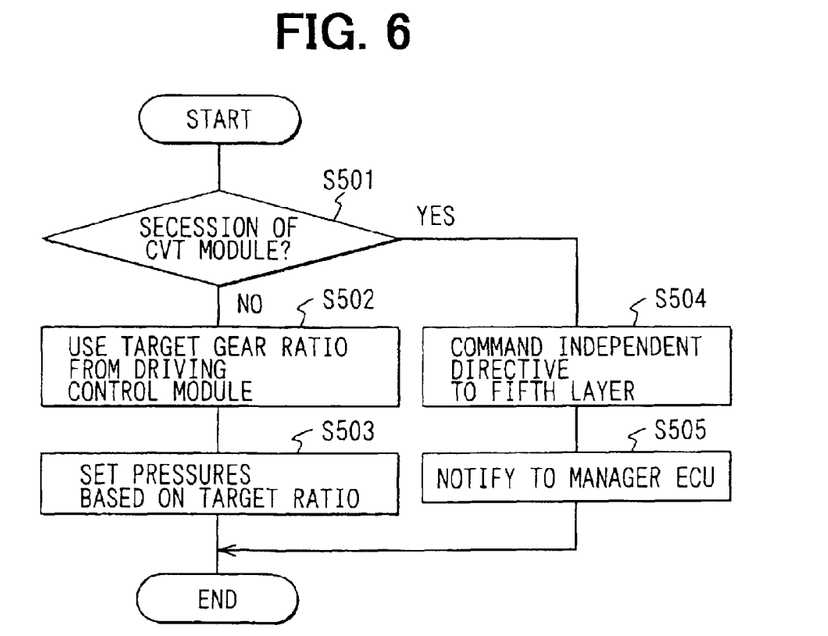
FIG. 6 is a flowchart representing hierarchical layer secession determination processing carried out by a CVT control module in the embodiment.

Next, the hierarchical layer secession determination processing carried out by the CVT control. module is explained by referring to the flowchart shown in FIG. 6.

The processing begins with step S501 to determine whether the CVT control module should secede from a hierarchical layer. The CVT control module is determined to secede from the hierarchical layer when the transmission gear ratio of the CVT can no longer be controlled with a high degree of freedom. The transmission gear ratio of the CVT can no longer be controlled with a high degree of freedom, for example, when the temperature of the operation oil becomes extremely high or an abnormal state such as a belt slip exists.

If the determination result provided at step S501 is YES indicating that the CVT control module should secede from a hierarchical layer, the processing moves to step S504 to compute an independent operation directive that sets both the primary oil pressure and the secondary oil pressure at maximum values, and supplies the operation directive to the CVT control module as a command. Then, at the next step S505, the manager control ECU 10 is notified of the non-execution of the directive.

If the determination result provided at step S501 is NO indicating that the CVT control module should not secede from the hierarchical layer, on the other hand, the processing moves to step S502 to use a command received from the brake control module as a target CVT transmission gear ratio. Then, at the next step S503, a target primary oil pressure and a target secondary oil pressure that are proper for the target CVT transmission gear ratio are set.

Specifically, the primary oil pressure is set so that a feedback of an actual transmission gear ratio matches the target transmission gear ratio. The actual transmission gear ratio is computed on the basis of a ratio of the number of revolutions on the input side of the CVT to the number of revolutions on the output side of the CVT. In addition, the secondary oil pressure for the target engine torque can be set from a map set in advance. Then, a solenoid driving signal is set and output so that the set secondary and primary oil pressures are implemented.

Figure 7:
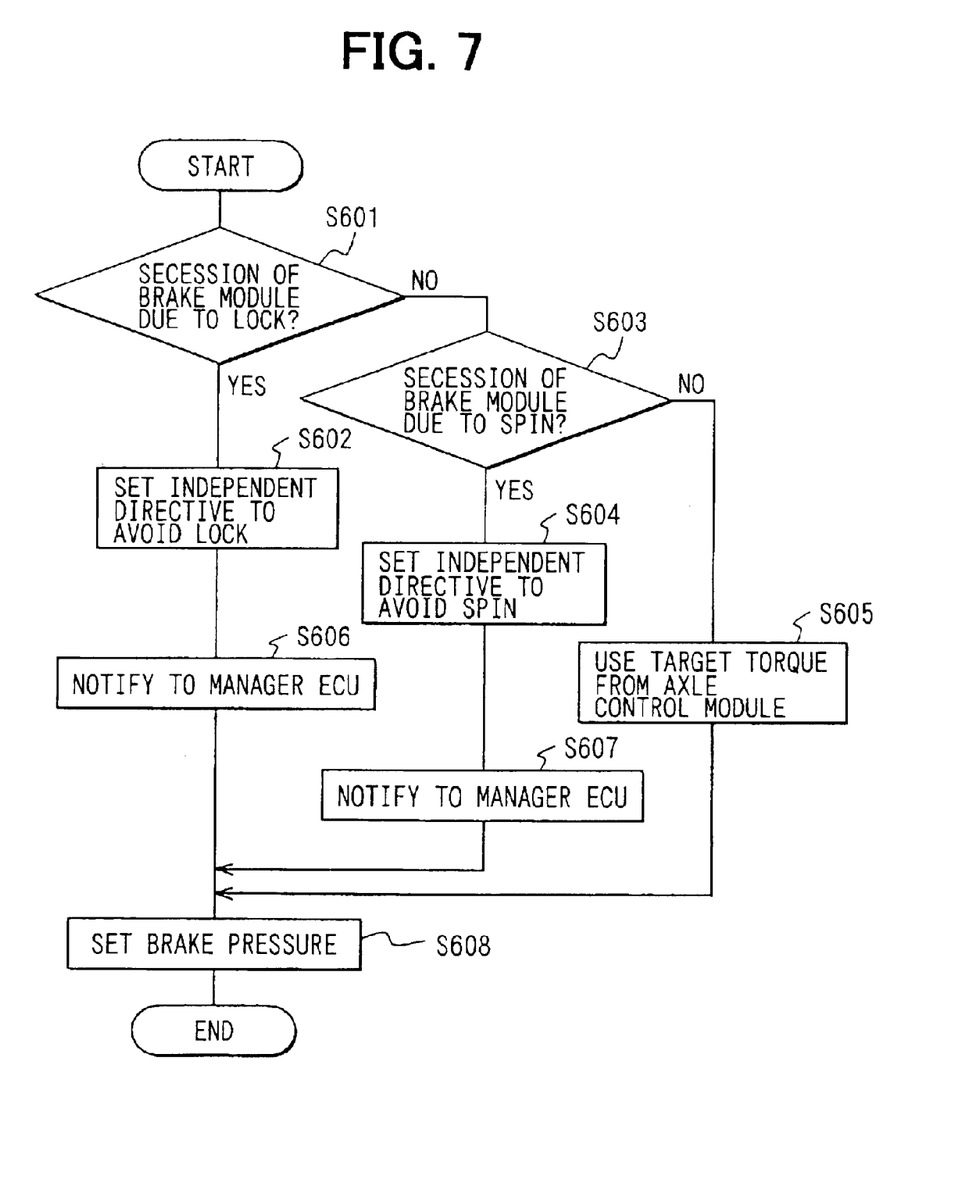
FIG. 7 is a flowchart representing hierarchical layer secession determination processing carried out by a brake control module in the embodiment.

Next, the hierarchical layer secession determination processing carried out by the brake control module is explained by referring to the flowchart shown in FIG. 7.

The processing begins with step S601 to determine whether the brake control module should secede from the hierarchical layer. Specifically, a wheel lock state is determined to exist when a brake torque exceeds a threshold value set in advance and a difference in speed between the front wheels and the rear wheels exceeds another threshold value also set in advance.

If the determination result provided at step S601 is YES indicating that the brake control module should secede from the hierarchical layer, the processing moves to step S602 to compute an independent operation directive used as a target brake torque, which is a brake torque not causing tires to be locked. Specifically, on the basis of the difference in speeds between the front wheels and the rear wheels, the target brake torque is computed from a map set in advance. Then, at the next step S606, after the independent operation directive is computed, the manager control ECU 10 is notified of the state of non-execution.

If the determination result provided at step S601 is NO indicating that the brake control module should not secede from the hierarchical layer because no wheel lock state exists, on the other hand, the processing moves to step S603 to determine whether the brake control module should secede from the hierarchical layer due to a wheel spin state. Specifically, the wheel spin state is determined to exist when the brake torque set in advance in the brake control module is equal to or smaller than a threshold value set in advance, a difference in speeds between the front wheels and the rear wheels exceeds another threshold value also set in advance and the wheel lock state is determined not to exist.

If the determination result provided at step S603 is YES indicating that the brake control module should secede from the hierarchical layer due to the existence of a wheel spin state, the processing moves to step S604 to compute an independent operation directive serving as a target brake torque for eliminating the wheel spin state. Specifically, a feedback system is applied to reduce a difference between a wheel highest speed and a wheel lowest speed. The wheel highest speed is the speed of one of the two driving wheels, which has a speed higher than the other one. On the other hand, the wheel lowest speed is the speed of one of the two driven wheels, which has a speed lower than the other one. Then, at the next step S607, an independent operation directive is computed and the manager control ECU 10 is informed of non-execution.

If the determination result provided at step S603 is NO indicating that the brake control module should not secede from the hierarchical layer due to the non-existence of the wheel spin state, on the other hand, the processing moves to step S605 to set a target driving torque given by the axle rotation power control module provided on the hierarchical layer at the highest level as an actual target brake torque.

Then, at the next step S608, a target brake oil pressure based on the computed target brake torque is set and supplied to the brake oil pressure control module provided on the fifth hierarchical layer. In more detail, the target brake oil pressure is set on the basis of the target brake torque from a map set in advance.

As described above, if the hierarchical layer secession determination processing carried out by any one of the engine control module, the lockup control module and the CVT control module, which are provided on the fourth hierarchical layer, produces a determination result indicating that the module should secede from the hierarchical layer, the modules independently control their respective system devices. If an independent operation directive is given to a system device in which a failure has occurred, however, it is necessary to execute control conforming to the independent operation directive on other system devices.

If the determination result indicates that the engine control module should secede from a hierarchical layer, for example, the engine control module gives an independent operation directive that sets a driving torque at 0 to the engine 2. With the driving torque set at 0, control conforming to the driving torque of 0 needs to be executed on the transmission 4, which comprises CVT and lockup mechanisms. Otherwise, a shock will be resulted in.

Thus, if the determination result indicates that a control module on the fourth hierarchical layer should secede from the layer, the driving control module on the third hierarchical layer one level above the fourth hierarchical layer is notified of the state of non-execution of the directive so that the driving control module gives operation directives to other control modules on the fourth hierarchical layer, which do not have failures occurring therein, so that the other control modules each carry out a predetermined operation conforming to the independent operation directive.

Figure 8:
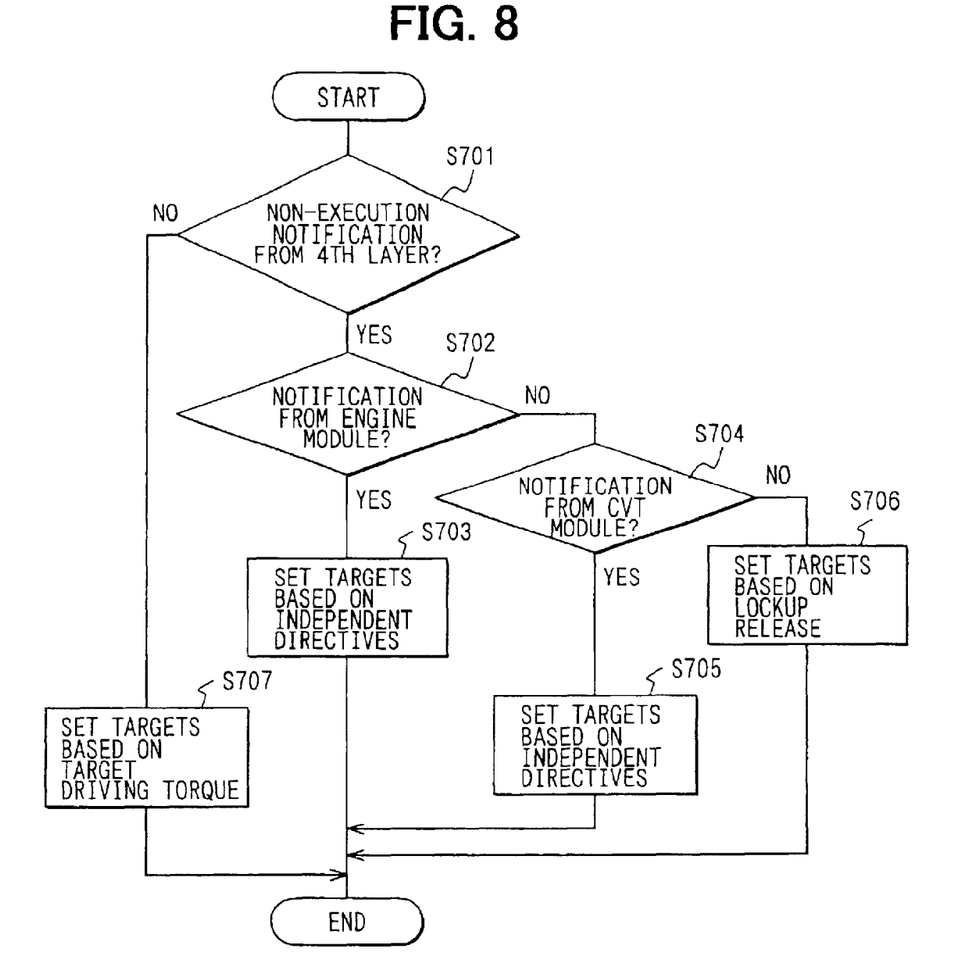
FIG. 8 is a flowchart representing control processing carried out by a driving control module in the embodiment.

FIG. 8 is a flowchart representing execution of a control command of control processing carried out by the driving control module provided on the third hierarchical layer. It should be noted that the control processing is carried out at predetermined intervals.

The processing begins. with step S701 to determine whether a notification of non-execution has been received from any one of the engine control module, the CVT control module and the lockup control module, which are provided on the fourth hierarchical layer at the lower level. If the determination result provided at step S701 is YES indicating that the notification of the state of non-execution has been received, the processing moves to step S702 to determine whether the notification of the state of non-execution has been received from the engine control module. If a determination result provided at step S702 is YES indicating that a notification of the state. of non-execution has been received from the engine control module, the processing moves to step S703 to set the target CVT transmission gear ratio and the target lockup that conform to the independent operation directive supplied to the engine 2.

If the determination result provided at step S702 is NO indicating that the notification of the state of non-execution has not been received from the engine control module, on the other hand, the processing moves to step S704 to determine whether the notification of the state of non-execution has been received from the CVT control module. If the determination result provided at step S704 is YES indicating that the notification of the state of non-execution has been received from the CVT control module, the processing moves to step S705 to set the target lockup state and the target engine torque that conform to the independent operation directive supplied to the CVT 4.

If the determination result provided at step S704 is NO indicating that the notification of the state of non-execution has not been received from the CVT control module, on the other hand, the processing moves to step S706 to release the lockup clutch state and to set the target CVT transmission gear ratio and the target engine torque that conform to the operation to release the lockup clutch state.

As described above, when the determination result provided at step S702 is YES indicating that the notification of the state of non-execution has been received from the engine control module, the processing moves to step S703 to set the target CVT transmission gear ratio and the target lockup as follows.

When the determination result provided at step S702 is YES indicating that the notification of the state of non-execution has been received from the engine control module, the engine control module issues the independent operation directive such as a command to prevent generation of a driving torque to the engine 2 independently of the command issued by the driving control module. For this reason, the driving control module issues operation directives conforming to the independent operation directive as commands to the CVT 4 and the lockup clutch so as to safely maintain the halted state of the engine.

Specifically, the target CVT transmission gear ratio is set by referring to the transmission map so as to result in an inertia running state such as the neutral (N) range. On the other hand, the target lockup is set so as to release the lockup clutch. It should be noted that, if the CVT and the lockup clutch are also in the seceding state, the CVT control module and the lockup control module also operate independently instead of functioning in accordance with received commands.

As described above, when the determination result provided at step S704 is YES indicating that the notification of the state of non-execution has been received from the CVT control module, the processing moves to step S705 to set the target lockup state and the target engine torque that conform to the independent operation directive supplied to the CVT 4, which are explained as follows.

When a determination result provided at step S704 is YES indicating that the notification of the state of non-execution has been received from the CVT control module, the CVT control module issues the independent operation directive such as an oil pressure to prevent a belt slip from occurring with a high degree of reliability. The driving control module issues operation directives to the engine control module and the lockup control module so that the operation of the CVT 4 can be carried out.

Specifically, the lockup control module receives a command to release the lockup clutch. This is because, when the CVT control module secedes from the hierarchical layer, smooth control can no longer be executed so that vibrations propagate to the axle shaft with ease, readily giving rise to uncomfortable feeling and shocks. By releasing the lockup clutch, vibrations hardly propagate to the axle shaft.

In addition, the engine control module receives the command to generate the target engine torque so as to set the target driving torque conforming to the actual transmission gear ratio. Specifically, the target engine torque is computed by dividing the target driving torque by the actual target transmission gear ratio to give a quotient and further dividing the quotient by a torque amplification ratio of the torque converter. The actual transmission gear ratio is found on the basis of the ratio of the number of revolutions on the input side of the CVT 4 to the number of revolutions on the output side of the CVT 4. The torque amplification ratio of the torque converter is found on the basis of the ratio of the number of revolutions on the input side of the torque converter to the number of revolutions on the output side of the torque converter by referring to a map set in advance.

As described above, when the determination result provided at step S704 is NO indicating that the notification of the state of non-execution has been received from the lockup control module, on the other hand, the processing moves to step S706 to set the target CVT transmission gear ratio and the target engine torque in processing, details of which are explained as follows.

When the lockup control module determines to secede itself from the hierarchical layer, the driving control module gives the command to the lockup control module to release the lockup clutch state. On the other hand, the driving control module supplies the target transmission gear ratio for realizing the target driving force to the engine control module as a command, and supplies the target engine torque to the CVT control module also as a command. The target transmission gear ratio is computed by referring to a map determined in advance to represent a relation between the speed of the vehicle and the target driving torque. As described above, the target engine torque is computed by dividing the target driving torque by the actual target transmission gear ratio to give a quotient and further dividing the quotient by the torque amplification ratio of the torque converter.

If the determination result provided at step S701 is NO indicating that no notification of the state of non-execution has been received, on the other hand, the processing moves to step S707 at which a target engine torque, the target CVT transmission gear ratio and the target lockup state are set so as to realize the target driving torque received from the axle rotation power control module.

Figure 9:
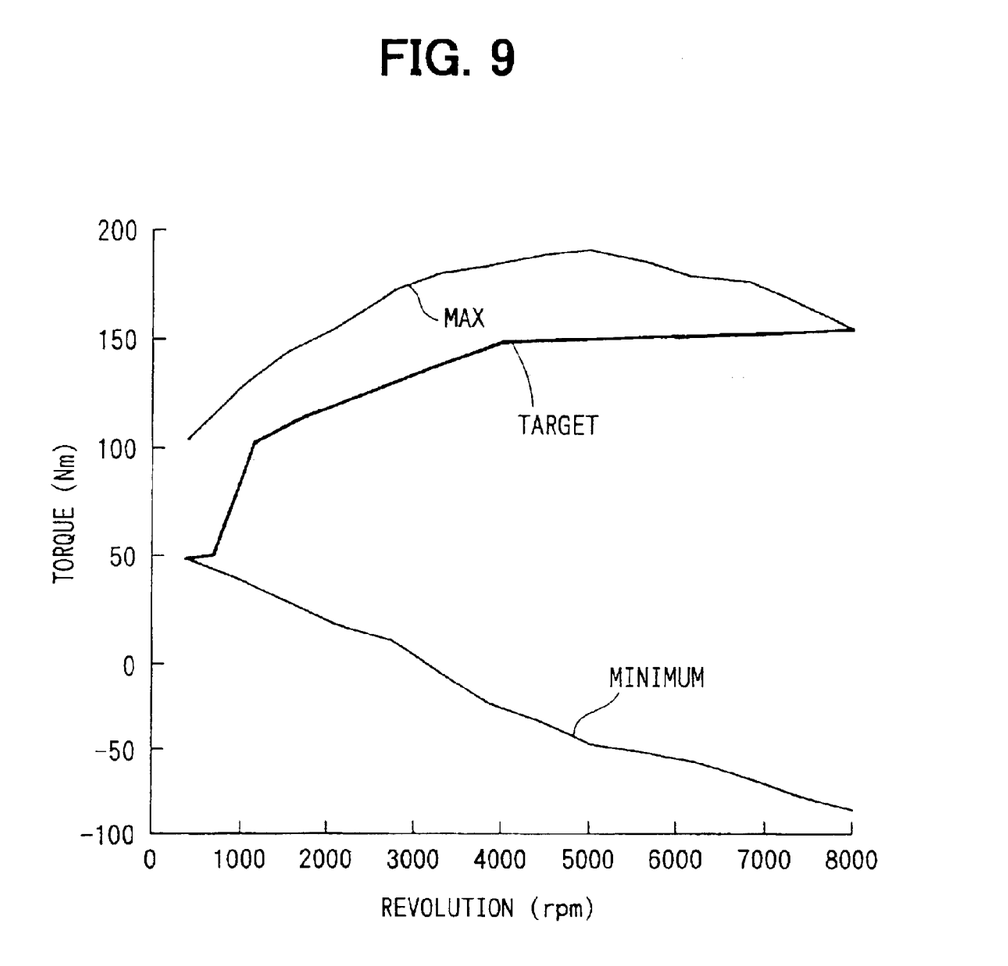
FIG. 9 is a map used for setting a target engine torque in the embodiment.

Specifically, the driving control module requests the lockup control module to carry out various kinds of processing for tightening or releasing the lockup state. The driving control module provides the engine control module with the target engine torque as a command to realize the target driving torque. The driving control module provides the CVT control module with the target transmission gear ratio as a command to realize the target driving torque. More Specifically, the target transmission gear ratio and the target engine torque are set from a map determined in advance to represent the relation between the speed of the vehicle and the target driving torque. As shown in FIG. 9, the map is a two-dimensional map with the abscissa representing the number of engine revolutions and the ordinate representing the engine torque. On the map, a curve representing target operating points is traced. Each of the target operating points is set by considering, among others, fuel economy and emission.

As described above, in this embodiment, when an abnormality occurs in the engine 2 or other system devices, the engine ECU 6 or other ECUs associated with the other abnormal devices determine to secede from the hierarchical layer associated with the engine control module or the other control modules for the other abnormal devices. Then, an independent operation directive is issued to the engine 2 or the other devices independently of the operation directive given by the manager ECU 10 so that the engine 2 or the other system devices carries out a predetermined operation.

As a result, it is possible to quickly take an action to cope with the abnormality occurring in the engine 2 or the other component.

In addition, when it is determined that any of the control modules provided on the fourth hierarchical layer should secede from the hierarchical layer, the driving control module is notified of the state of non-execution and the driving control module issues operation directives conforming to an independent operation directive to control modules other than the seceding control module.

As a result, since it is possible to cope with the abnormality of the engine, for example, a driving force generator control unit executes control to directly reduce the driving force of the engine, and the transmission's transmission stage or the like is controlled in accordance with the reduced driving force so that the magnitude of a transmission shock can be decreased.

Next, a modification of this embodiment is explained.

In the above embodiment, when an abnormality occurs in the engine 2 or other system devices, the engine ECU 6 or the other ECUs associated with the other abnormal devices determine to secede from the hierarchical layer. When the transmission 4 performs the transmission operation in accordance with the operation carried out by the driver, however, the CVT control module and the lockup control module, which are incorporated in the CVT ECU 7, may also control the transmission 4 independently.

When the driver changes the shift lever from the drive (D) range to the neutral (N) range during a running state of the vehicle, for example, the CVT ECU 7 may issues an operation directive based on the operation of the shift lever as a command to the transmission 4 to cut off transfer of the driving power from the engine to the axle shaft so that it is possible to quickly cope with the transmission operation carried out by the driver. As a result, it is possible to quickly cope with the transmission operation carried out by the driver.

As another modification, the hierarchical layer secession determination processing can be carried out in any control module provided on the fifth hierarchical layer instead of carrying out the hierarchical layer secession determination processing in a control module provided on the fourth hierarchical layer as is the case with the embodiment.

When the injector control module incorporated in the engine ECU 6 carries out processing to determine whether to secede from the hierarchical layer, for example, if a failure has occurred in the injector, the result of the determination indicates that the injector control module should secede from the hierarchical layer. In this case, an independent operation directive for driving the injector to carry out a predetermined operation may be given to the injector independently of a command issued by the engine control module provided on the fourth hierarchical layer. At that time, the engine control module provided on the fourth hierarchical layer may also be informed of the state of non-execution so that the engine control module provided on the fourth hierarchical layer issues operation directives conforming to the independent operation directive to other control modules provided on the fifth hierarchical layer. The other control modules provided on the fifth hierarchical layer are the electronic throttle control module and the ignition control module.

Furthermore, the driving control module provided on the third hierarchical layer may also be informed of the state of non execution so that the driving control module provided on the third hierarchical layer issues operation directives conforming to the independent operation directive to lockup control module and the CVT control module, which are provided on the fourth hierarchical layer. As a result, it is possible to quickly cope with the operation carried out by the driver on the transmission.

As a further modification, the driving control module provided on the third hierarchical layer may also carry out processing to determine whether the module should secede from the hierarchical layer. When an abnormality occurs in the engine 2, for example, the driving control module determines whether the module should secede from the hierarchical layer, issuing an independent operation directive as a command to the engine ECU 6 and an operation directive as a command to the CVT ECU 7 to request the CVT ECU 7 to carry out a predetermined operation conforming to the independent operation directive. As a result, it is possible to cope with an abnormality occurring in a system device quicker than the conventional way in which each system device is controlled to wait for a command to be issued by a hierarchical layer at a higher level.

The present invention should not be limited to the disclosed embodiment and modifications, but may be implemented in various other ways.

What is claimed is:

1. An integrated control system for a vehicle comprising:
   a plurality of system device control units for controlling operations carried out by a plurality of system devices employed in a vehicle in accordance with control programs set in advance; and
   a manager control unit for providing the system device control units with commands serving as operation directives of the system devices controlled by the system device control units,
   wherein at least a particular one of the system device control units has a hierarchical layer secession determination means for determining whether a particular system device controlled by the particular system device control unit has entered a predetermined operational state requiring that a predetermined operation taking precedence of execution of an operation directive issued by the manager control unit be carried out, and
   wherein, if the hierarchical layer secession determination means determines that the predetermined operation should be carried out, the particular system device control unit issues a command to the particular system device as an independent operation directive for driving the particular system device to carry out the predetermined operation independently of an operation directive issued by the manager control unit.

2. An integrated control system for a vehicle according to claim 1,
   wherein at least a particular one of the system device control units has a system device control unit for controlling a particular system device, and a system device integrated control unit for giving a command as an operation directive to the particular system device and having a hierarchical layer secession determination means, and
   wherein, if the hierarchical layer secession determination means determines that the particular system device has entered a predetermined operational state requiring that a predetermined operation taking precedence of execution of an operation directive issued by the manager control unit be carried out, the particular system device integrated control unit issues a command to the particular system device as an independent operation directive for driving the particular system device to carry out the predetermined operation independently of an operation directive issued by the manager control unit.

3. An integrated control system for a vehicle according to claim 1,
   wherein at least a particular one of the system device control units has a system device control unit for controlling a particular system device, and a system device integrated control unit for giving a command as an operation directive to the particular system device and having a hierarchical layer secession determination means, and wherein, if the hierarchical layer secession determination means determines that the particular system device has entered a predetermined operational state requiring that a predetermined operation taking precedence of execution of an operation directive issued by the manager control unit be carried out, the particular system device control unit issues a command to the particular system device as an independent operation directive for driving the particular system device to carry out the predetermined operation independently of an operation directive issued by the system device integrated control unit.

4. An integrated control system for a vehicle according to claim 1, wherein the particular system device control unit is a transmission control unit for controlling a transmission mounted on the vehicle as the particular system device, and wherein, when a driver carries out a transmission operation on the transmission, the hierarchical layer secession determination means determines that the transmission has entered a predetermined operational state requiring that a predetermined operation taking precedence of execution of an operation directive issued by the manager control unit be carried out, and the transmission control unit issues a command to the transmission as an independent operation directive for driving the transmission to perform a transmission changeover according to the transmission operation carried out by the driver.

5. An integrated control system for a vehicle according to claim 1, wherein at least a particular one of the system device control units has a hierarchical layer secession determination means, and wherein, when an abnormality occurs in a particular system device controlled by the particular system device control unit, the hierarchical layer secession determination means determines that the particular system device has entered a predetermined operational state requiring that a predetermined operation taking precedence of execution of an operation directive issued by the manager control unit be carried out, and the particular system device control unit issues a command to the particular system device as an independent operation directive for driving the particular system device to carry out the predetermined operation coping with the abnormality.

6. An integrated control system for a vehicle according to claim 5, wherein a particular one of the particular system device control units is a driving power generator control unit for controlling a driving power generating source mounted on the vehicle, and wherein, when an abnormality occurs in the driving power generating source controlled by the driving power generator control unit, the driving power generator control unit issues a command to the driving power generating source as an independent operation directive for driving the driving power generating source to carry out the predetermined operation coping with the abnormality occurring in the driving power generating source.

7. An integrated control system for a vehicle according to claim 6, wherein the driving power generating source controlled by the driving power generator control unit is an engine of the vehicle, and wherein, when an abnormality occurs in the engine, the driving power generator control unit issues a command to the engine as an independent operation directive for driving the engine to reduce a driving power output by the engine.

8. An integrated control system for a vehicle according to claim 5, wherein the particular system device control unit is a transmission control unit for controlling a transmission mounted on the vehicle as the particular system device, and wherein, when an abnormality occurs in the transmission, the transmission control unit issues a command to the transmission as an independent operation directive for driving the transmission to perform a predetermined operation coping with the abnormality occurring in the transmission.

9. An integrated control system for a vehicle according to claim 8, wherein the transmission controlled by the particular transmission control unit is a transmission having a torque converter equipped with a lockup mechanism, and wherein, when an abnormality occurs in the lockup mechanism, the transmission control unit issues a command to the transmission having the torque converter equipped with the lockup mechanism as an independent operation directive for driving the transmission to release the lockup mechanism.

10. An integrated control system for a vehicle according to claim 5, wherein the particular system device control unit is a brake control unit for controlling a brake device mounted on the vehicle as the particular control device, and wherein, when an abnormality occurs in the brake device, the brake control unit issues a command to the brake device as an independent operation directive for driving the brake device to carry out a predetermined operation coping with the abnormality occurring in the brake device.

11. An integrated control system for a vehicle according to claim 10, wherein, when a driving wheel of the vehicle is determined to be in a wheel spin or a wheel lock state, the brake control unit issues a command to the brake device as an independent operation directive for driving the brake device to generate a braking torque to get rid of the wheel spin or a wheel lock state.

12. An integrated control system for a vehicle according to claim 1, wherein, if the hierarchical layer secession determination means determines that a particular system device controlled by the particular system device control unit has entered a predetermined operational state requiring that a predetermined operation taking precedence of execution of an operation directive issued by the manager control unit be carried out, the particular system device control unit notifies the manager control unit of the predetermined operational state of non-execution, and wherein, if the manager control unit is notified of the predetermined operational state of non-execution, the manager control unit gives a command to each of the system device control units other than the particular system device control unit as an operation directive for driving the other system device control unit to carry out a predetermined operation conforming to the independent operation directive.

13. An integrated control system for a vehicle comprising:

a plurality of system device control units for controlling operations carried out by a plurality of system devices employed in a vehicle in accordance with control programs set in advance; and a manager control unit for providing the system device control units with commands serving as operation directives of the system devices controlled by the system device control units, wherein the manager control unit has at least a vehicle whole operation determining means for determining an operation of the vehicle as a whole, and a system device integrated control unit for giving a command to any of the system device control units as an operation directive based on an operation directive issued by the vehicle whole operation determining means as a command, wherein the system device integrated control unit has a hierarchical layer secession determination means for determining whether a particular system device controlled by a particular one of the system device control units has entered a predetermined operational state requiring that a predetermined operation taking precedence of execution of an operation directive issued by the manager control unit be carried out, and wherein, if the hierarchical layer secession determination means determines that the particular system device has entered a predetermined operational state requiring that the predetermined operation be carried out, the system device integrated control unit issues a command to the particular system device control unit as an independent operation directive for driving the particular system device to carry out the predetermined operation and a command to each of the system device control units other than the particular system device control unit as an operation directive for driving the other system device control unit to carry out another predetermined operation conforming to the independent operation directive.

14. A method of providing integrated control of a vehicle, the method comprising:

controlling operations performed by a plurality of system devices employed in a vehicle through a plurality of system device control units in accordance with control programs set in advance; and providing the system device control units with commands serving as operation directives of the system devices controlled by the system device control units from a manager control unit, wherein at least a particular one of the system device control units provides a hierarchical layer secession determination including determining whether a particular system device controlled by the particular system device control unit has entered a predetermined operational state requiring that a predetermined operation taking precedence of execution of an operation directive issued by the manager control unit be carried out, and wherein, if the hierarchical layer secession determination is made so that the predetermined operation should be carried out, the particular system device control unit issues a command to the particular system device as an independent operation directive for driving the particular system device to carry out the predetermined operation independently of an operation directive issued by the manager control unit.

15. A method according to claim 14, wherein, if the hierarchical layer secession determination determines that a particular system device controlled by the particular system device control unit has entered a predetermined operational state requiring that a predetermined operation taking precedence of execution of an operation directive issued by the manager control unit be carried out, the particular system device control unit notifies the manager control unit of the state of non-execution, and wherein, if the manager control unit is notified of the state of non-execution, the manager control unit gives a command to each of the system device control units other than the particular system device control unit as an operation directive for driving the other system device control unit to carry out a predetermined operation conforming to the independent operation directive.

* * * * *